United States Patent [19]

Bollella

[11] Patent Number: 5,974,439
[45] Date of Patent: Oct. 26, 1999

[54] RESOURCE SHARING BETWEEN REAL-TIME AND GENERAL PURPOSE PROGRAMS

[75] Inventor: Gregory Bollella, Carrboro, N.C.

[73] Assignee: International Business Machines Corporation, Armonk, N.Y.

[21] Appl. No.: 08/975,847

[22] Filed: Nov. 21, 1997

[51] Int. Cl.$^6$ ...................................... G06F 9/00
[52] U.S. Cl. ........................ 709/104; 709/102; 709/104
[58] Field of Search ..................................... 395/674, 672

[56] References Cited

U.S. PATENT DOCUMENTS 5,528,513  6/1996  Vaitzblit et al. ..................... 364/514
5,748,468  5/1998  Notenboom et al. .................. 364/132

OTHER PUBLICATIONS

IBM Technical Disclosure Bulletin, No. 5, Oct. 1992, pp. 8–10 "Extended Micro Channel for Realtime Multimedia Applications", New York.

Primary Examiner—Lucien U. Toplu
Assistant Examiner—Lewis A. Bullock, Jr.
Attorney, Agent, or Firm—Jeanine S. Ray-Yarletts

[57] ABSTRACT

The present invention provides a method, system, and program product for sharing resources between real-time and non-real-time (or general purpose) programs in a computer system which utilizes Slotted Priority Architecture. Non-pre-emptable, internally triggered resources are shared using the method of the present invention. The real-time scheduler anticipates upcoming realtime minor cycles and, using knowledge of which resources are to be used by the next scheduled real-time task and of the latency times of the resources to be used, signals the device drivers for the resources to be used to stop accepting requests from general purpose tasks far enough in advance to the beginning of the real-time minor cycles that will utilize them to ensure that the resources will be idle and available for the real-time tasks to use without delay.

6 Claims, 5 Drawing Sheets

RESOURCE SHARING BETWEEN REAL-TIME AND GENERAL PURPOSE PROGRAMS

RELATED APPLICATIONS

Application Ser. No. 08/472,365, titled "System and Method for Supporting Real-Time Computing within General Purpose Operating Systems," filed Jun. 7, 1995 and assigned to the assignee of the present invention; and application Ser. No. 08/975,869 titled "System and Method for Supporting Real-Time Computing within General Purpose Systems," filed Nov. 21, 1997; and assigned to the assignee of the present invention.

FIELD OF THE INVENTION

The present invention relates to data processing, and in particular to resource sharing between real-time and non-real-time (also known as general purpose) programs coresident in a data processing system.

BACKGROUND OF THE INVENTION

The related applications describe a method of providing support for real-time computing within general purpose computing systems and, are incorporated by reference herein. The method described, known as slotted priority architecture (SPA), is to multiplex control of the system between a real-time program, which may be an application or an operating system, and a general purpose program which may be an application or an operating system as shown in FIG. 1. This multiplexing is accomplished by dividing a so-called major cycle (MC) 52 into a real-time minor cycle (mcrt) 51, during which general purpose tasks are suspended and real-time tasks have complete control of the system, and a non-real-time minor cycle (mcnrt) 50 during which general purpose tasks operate. SPA as described in the copending applications excels at sharing resources, such as the system processor, that are pre-emptable, meaning that they can be interrupted and given over to a different task at virtually any time by simply saving state information for the task being interrupted, and restoring that information when the interrupted task is resumed.

A real-time thread or task operating under an SPA system must have an upper bound on the time required to execute its real-time cycle. It must not block for an indefinite time on any system call, including system calls to access shared resources such as physical devices or software modules. This requirement may become problematic if the real-time thread must access resources, such as physical devices, that are shared with the general-purpose system and are not pre-emptable, for example because they have long latency times during atomic requests. Although SPA ensures that the system processor resource and other pre-emptable resources are available to the real-time tasks when such access is required, it does not ensure that all shared resources, such as non-pre-emptable physical devices, are available.

For example, assume a real-time thread running under SPA must read information off a direct access storage device (DASD) such as a disk drive. If the general purpose system had sent an access request to the disk drive just before the end of the non-real-time minor cycle 50, the disk device may not be available until several microseconds into the subsequent real-time minor cycle 55, as the access request may require several time slots 53 to complete. This delay could cause the real-time minor cycle to fail to complete on schedule due to the delay caused by waiting for the disk device to be free.

This problem can occur with any system resource, such as a physical device or even a software module, which has a latency between the time an atomic service is requested and it completes. While the SPA ensures that real-time minor cycles start on time on pre-emptable resources such as a processor, it does not ensure that all shared resources are available at that time.

Several approaches have been taught in the prior art to attempt to solve this and other shared-device availability problems. Much of the prior art in the field centers on ensuring the exclusivity of resource access, which is a well-known problem in both real-time and non-real-time applications and has many well-known solutions. For an example of the teachings available for the simple exclusivity problem, the reader is referred to *Software Design for Real-time Systems*, J. E. Cooling, Chapman and Hall, 1991, pages 303–317. This reference teaches only maintaining exclusivity of resource access, not methods of ensuring resources are available when they are needed by realtime tasks.

Additionally, U.S. Pat. No. 5,535,416, "Method for Allowing Application Program in Computer System to Access Device Directly in Exclusive Mode by Bypassing Operating System and Blocking Requests from Other Programs," and U.S. Pat. No. 5,671,442, "System Having Device Driver Operates in First Mode for Allowing Concurrent Access to Adapter by Applications and Second Mode for Limiting Access to One Application" both describe a method and system for using an interface that bypasses normal operating system interfaces to give certain programs exclusive control of a device to the exclusion of all other programs on a system. This method is also useful for ensuring acceptable performance of access to the devices, which is important for real-time systems. However, these patents do not teach a method of ensuring that the device in question is available when the exclusive access is needed; instead they teach simply rejecting the exclusive access request if the device in question happens to be in use when the exclusive access is requested.

Proportional share algorithms are a well-known solution in the prior art for resource sharing between real-time and non-real-time components of a system. In these algorithms, resources to be shared are divided into quantized pieces, and tasks are assigned weights, which represent the proportion of pieces of shared resource they are to receive. This algorithm attempts to ensure that all processes in the system, whether real-time or general purpose, progress at approximately the same rate. For more information on proportional share algorithms, a good reference is "A Proportional Share Resource Allocation Algorithm for Real-Time, Time-Shared Systems," by Ion Stoica, et. al., 17th IEEE Real-Time Systems Symposium, IEEE Computer Society Press, 1996, pages 288–299. However, proportional share systems do not attempt to guarantee that real-time tasks receive resource when they require them; instead proportional share algorithms teach toward ensuring fairness between all tasks in a system, including general purpose tasks.

Another prior art method for attempting to ensure that a resource is available when real-time access to it is required is to have more than one instance of the resource, so that one instance can be dedicated to real-time needs. For example, if the resource in question is access to a network adapter card, a computer system could have two network adapter cards, one dedicated to real-time needs and one dedicated to general purpose needs. This solution does not actually share resources, and is obviously inefficient and may not be usable in cases in which it is not practical to have multiple instances of a resource, for example when the resource is a user input device such as a keyboard or a mouse.

Non-pre-emptable resources may be further divided into two additional categories. Non-pre-emptable, externally triggered devices such as network adapters and input devices such as a keyboard or a mouse may become busy due to stimuli outside the control of the computer system, such as a packet arriving over an attached network or a user action. The computer system cannot completely control these resources' availability to real-time tasks. Non-pre-emptable, internally triggered devices are those such as disk drives, sound cards, etc. which are under complete control of the computer system in which they reside. These devices become idle and available after completing tasks assigned to them by the computer system, and will remain idle and available until the system makes another request of them.

OBJECT OF THE INVENTION

It is the object of the present invention to ensure that shared system resources which are non-pre-emptable and internally triggered are available to real-time tasks when they are required by such tasks.

SUMMARY OF THE INVENTION

The present invention describes a method, system, and computer program product for ensuring that shared system resources are available to real-time tasks when the real-time tasks require access to them. In the Slotted Priority Architecture (SPA), control of a computer system is multiplexed between a real-time system and a general-purpose system by a so-called executive, in cooperation with a scheduler component in the real-time system. Real-time tasks have control of the computer system during periodic time intervals. The real-time scheduler knows how many time units are to elapse before start of the next real-time minor cycle, and the maximum latency times of all shared system resources. Using the method of the present invention, the real-time tasks register with the scheduler, and inform it which shared resources they will expect to use. Using this knowledge, the scheduler ensures that the shared resources will be available during the upcoming real-time minor cycle by signaling the devices, at a time at least equal to the number of time units before the start of the next real-time minor cycle equal to the maximum latency of resources in question, to cease accepting requests from general purpose tasks. This ensures that, when the real-time minor cycle starts, all shared resources required by the real-time tasks will be available and idle, thereby preventing delays in the real-time tasks caused by waiting for device availability.

BRIEF DESCRIPTION OF THE DRAWINGS

The preferred embodiment of the present invention will be herein described in more detail with reference to the drawings, in which.

DETAILED DESCRIPTION OF THE PREFERRED EMBODIMENT

Figure 2:
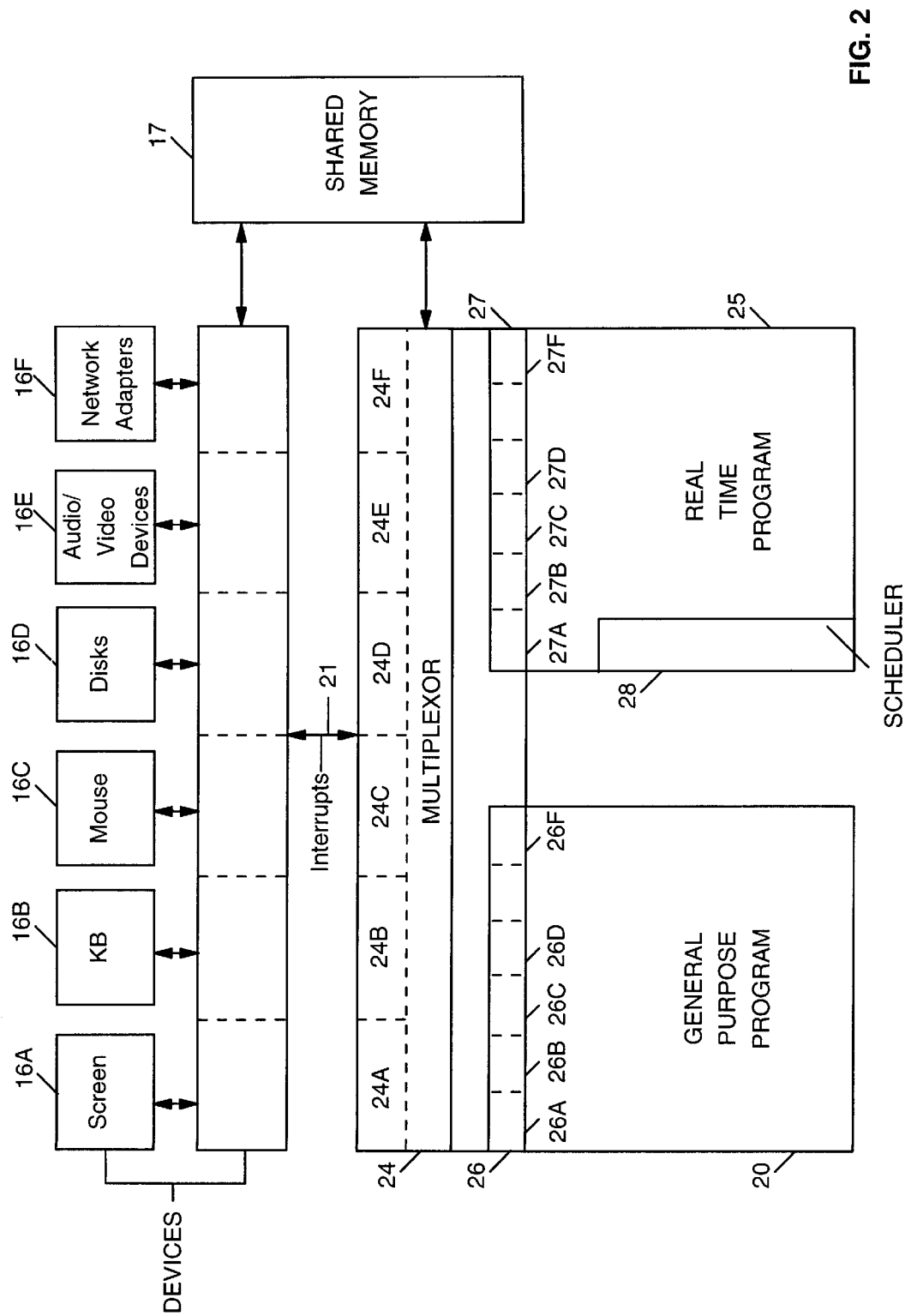
FIG. 2 is a diagram of logical device driver and executive organization in an SPA system.

The preferred embodiment of the present invention will be herein described with reference to a real-time Java environment using the SPA architecture as shown in FIG. 2, and for illustrative purposes, a disk drive device 16D. Java is a trademark of Sun Microsystem, Inc. The present invention is not limited to an SPA Java environment or to disk drive devices, and is applicable to any computer system in which real-time tasks are multiplexed with general purpose tasks on a periodic basis, and non-pre-emptable, internally triggered system resources are shared between the real-time and the general purpose tasks.

As part of their initialization, real-time Java threads operating in an SPA Java system must reserve resources they intend to use. For example, a real-time thread that intends to use the real-time write to disk operation provided by the real-time kernel (RTK) would execute the following code before entering the real-time loop:

blocks=5; //the number of disk blocks per write
writes=1; // the number of writes per iteration
rc=ReserveResource(DISK, READ, blocks, writes);

The ReserveResource procedure above informs the real-time system's scheduler 28 that this thread's real-time loop is reserving use of the disk.

The scheduler may reside anywhere in the system although it is logically associated with the real-time system and is depicted as part of the real-time system herein. The scheduler also takes parameters which indicate the type and magnitude of access which will be needed, so that these parameters can be used in computing the overall cost of the real-time loop being registered, as is required by the SPA architecture.

Figure 3:
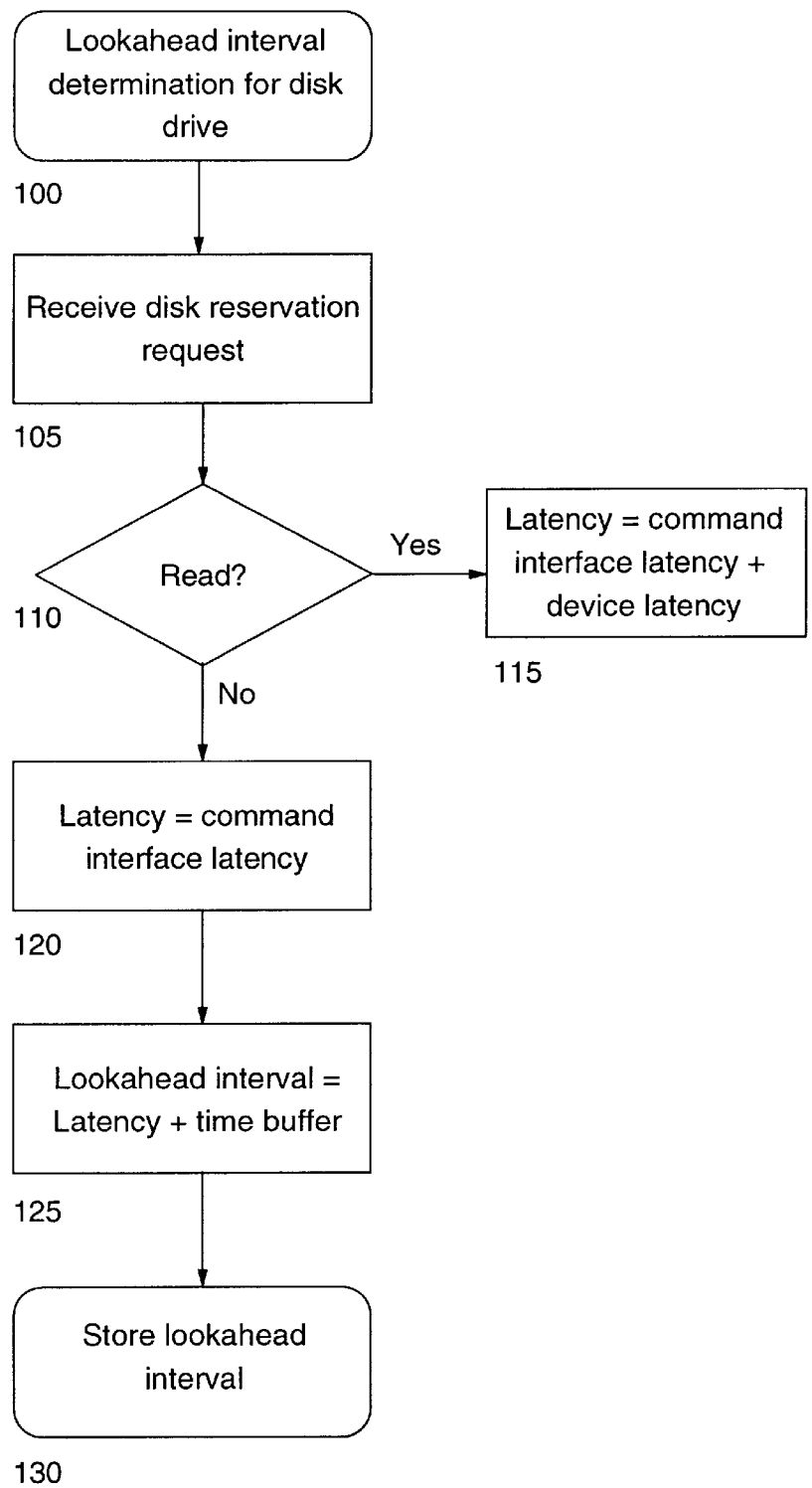
FIG. 3 illustrates computation of the look ahead interval for a disk drive device.

As each use of a physical device is reserved the scheduler calculates a so-called look ahead interval based on the type of usage requested and the known maximum operation times of the device. For example, in the example above a disk read is being reserved. The computation of the look ahead interval for a disk operation is shown in FIG. 3. This interval is computed by adding a time buffer, the value of which is discussed below, to the latency of the disk device.

There may be two components of the latency for a disk device 12S. The first component is the time required to access the device's command interface, which operation may consist of placing commands in a storage buffer dedicated to the purpose and allowing the disk device to retrieve the commands, thereby freeing the dedicated buffer for the set of commands for the next operation. The second component may consist of the time required for the disk device to actually complete the requested operation, e.g., to perform the commands and physically read data from or write data to the disk platters. The actual values of these latency times may be obtained by analyzing the manufacturer's specifications and documentation of the device.

If the operation is a write, the latency from the real-time task's point of view may simply be the first component described above: accessing the command interface. It may not be necessary for the physical disk device itself to be idle or free when the operation is performed, only the command interface, because the task performing the write has no need to await the completion of the operation. Note that this would be the case if the real-time task does not require confirmation of successful completion of a write. If such confirmation is required, the write latency may be both components. For purposes of this example, assume the real-time task does not require confirmation of the write.

If the operation is a read, then the latency is both components described above, because the task must receive results back from the disk device before the operation is completed from the task's point of view, meaning it is necessary that both the command interface and the device itself be idle when the real-time task needs to use it.

This computation of the look ahead interval is illustrated in FIG. 3. When the reservation request is received 105, the scheduler determines 110 if it is a read or a write request. If it is a read request, then the command interface latency and the device latency are added together to determine the overall latency 115. If it is a write, then only the command interface latency is used 120. The time buffer is added to the latency to determine the look ahead interval 125, which is stored by the scheduler 130.

Using the method of the present invention, the scheduler 28 continuously looks ahead at the schedule of real-time threads and determines if any of the threads to be run within the next look ahead interval have reserved the use of the device, which in the case of this example is a disk drive. As the scheduler 28 approaches a point in time ahead of the start of the task that reserved use of the disk drive equal to the computed look ahead time, a signal is sent to the disk drive's general purpose driver 26D commanding it to stop issuing commands to the disk drive from non-real-time programs 20, causing it to enter a so-called sleep interval. The signal may also indicate the duration of the period of time during which commands are not to be sent, so that it is not necessary for the scheduler to send another signal when the real-time task has completed its use of the device. During the sleep interval, the disk drive's general purpose driver may continue to accept requests from the general purpose programs and simply queue them up until the sleep interval or it may simply reject requests from the general purpose programs with a "device busy" type of error code.

Figure 4:
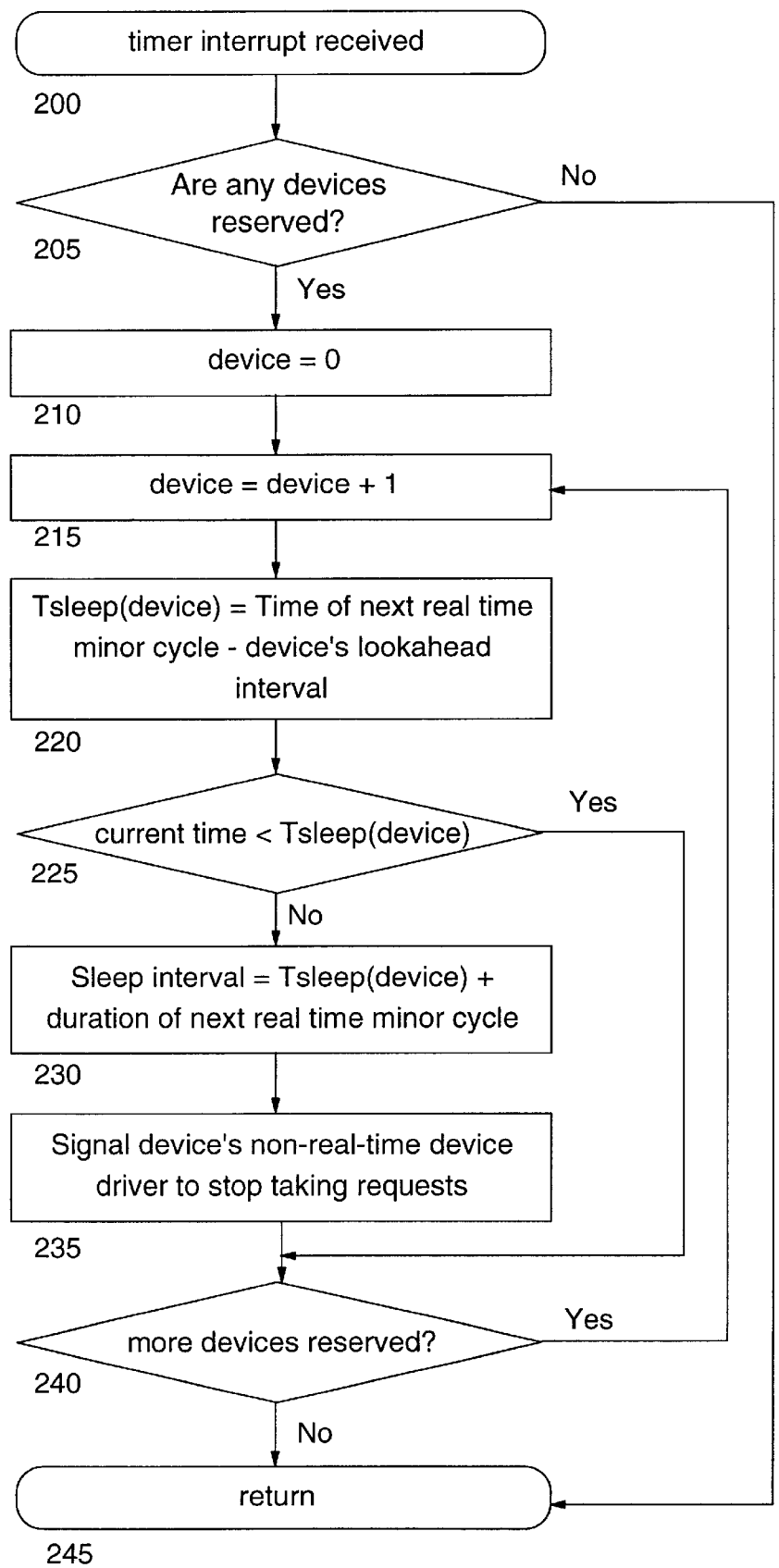
FIG. 4 illustrates logic a scheduler may use with the method of the present invention at periodic time intervals to ensure that system resources are available to real-time tasks.

The logic within one embodiment of the scheduler logic is shown in FIG. 4. During periodic time intervals 200, the scheduler receives control and checks to see if the use of any devices is reserved by the next real-time task to be scheduled 205. If so, it loops (210,215,240) through the reserved devices and for each one computes a value for Tsleep 220, which is the time at which the scheduler will be required to perform the logic of the present invention. The Tsleep value may be computed each time the scheduler does its check, or it may be computed once and stored for use in subsequent checks. For purposes of this illustration, it is computed each time through the loop. Tsleep is simply a point in time before the start of the next real-time minor cycle equal to the device's look ahead interval. If Tsleep for the device in question has not been reached 225, there is no further work to be done at the current time. If it has been reached, then the scheduler computes a sleep interval 230 sufficient to keep the device unavailable to general purpose tasks until the end of the upcoming real-time minor cycle. This value is illustratively shown as the lookahead interval added to the length of the upcoming real time minor cycle, however other values may be appropriate depending on system configuration (for example, a value sufficient to ensure that the driver sleeps until the real-time minor cycle begins may be appropriate, as general purpose programs will be suspended during the real-time minor cycle and not able to issue device requests). The scheduler then signals the device's general purpose device driver to sleep, or not pass on requests to the device's actual device driver, for the sleep interval 235. This logic is performed for each device whose use is reserved by the real-time tasks to be executed in the next real-time minor cycle 240.

Figure 1:
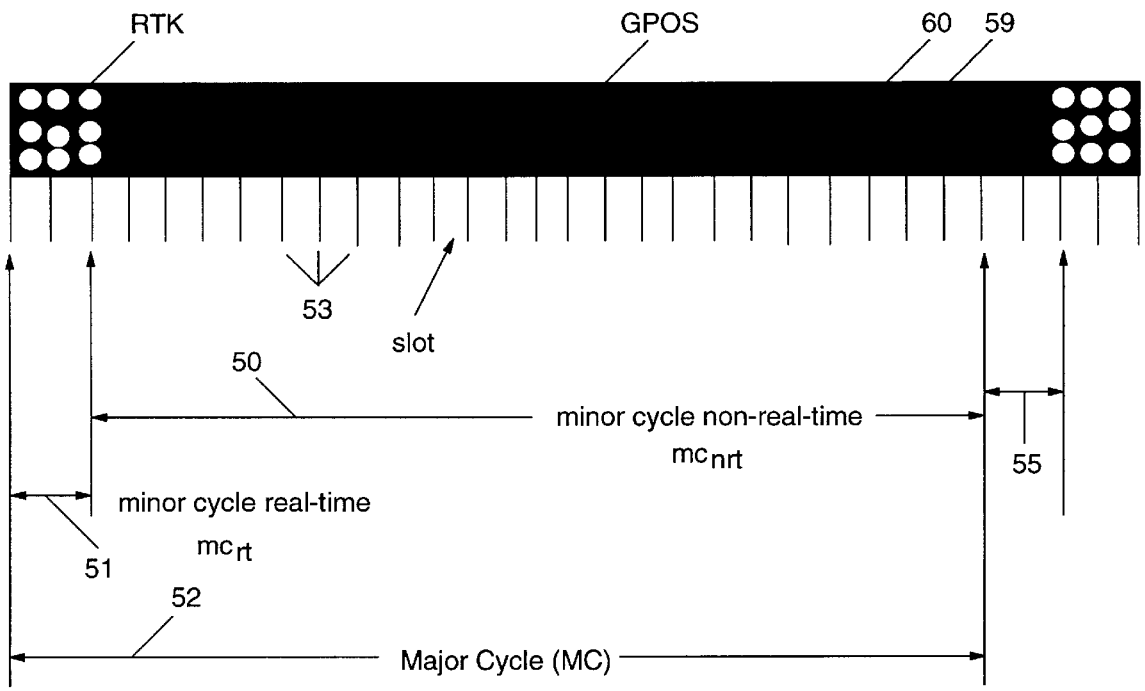
FIG. 1 is a timing diagram of the multiplexing of non-real-time and real-time tasks.

For example, if the look ahead interval of the disk write is equivalent to two time slots 53, then the scheduler will send its signal at point 60 of FIG. 1, with a sleep interval equivalent to four time slots.

The time buffer which is added to the device latency time to compute the look ahead interval should be equal to at least the number of time units that will elapse before the next invocation of the scheduler. This value is to ensure that the scheduler will always have enough time before the next real-time minor cycle to properly signal a long enough sleep interval. For example, with reference to FIG. 1, assume the scheduler runs at the beginning of every time slot 53 shown in the diagram. If the device latency is exactly 1 time slot, then without the time buffer added, when the scheduler gets control at time slot 60, it will not send the sleep signal because the time until the next real-time minor cycle is 2 time slots, and the look ahead interval is only 1. Then, when the scheduler gets control at the beginning of time slot 59, it will send the sleep signal. However, time slot 59 will have partially elapsed by the time the general purpose driver receives and processes the sleep signal, so a full 1 time slot sleep interval will not have been achieved before the real-time minor cycle starts, meaning the device may not be idle at that time. By adding a buffer to the look ahead interval equal to the time between invocations of the scheduler (in this example, 1 time slot), this error is avoided.

Figures 5, 6:
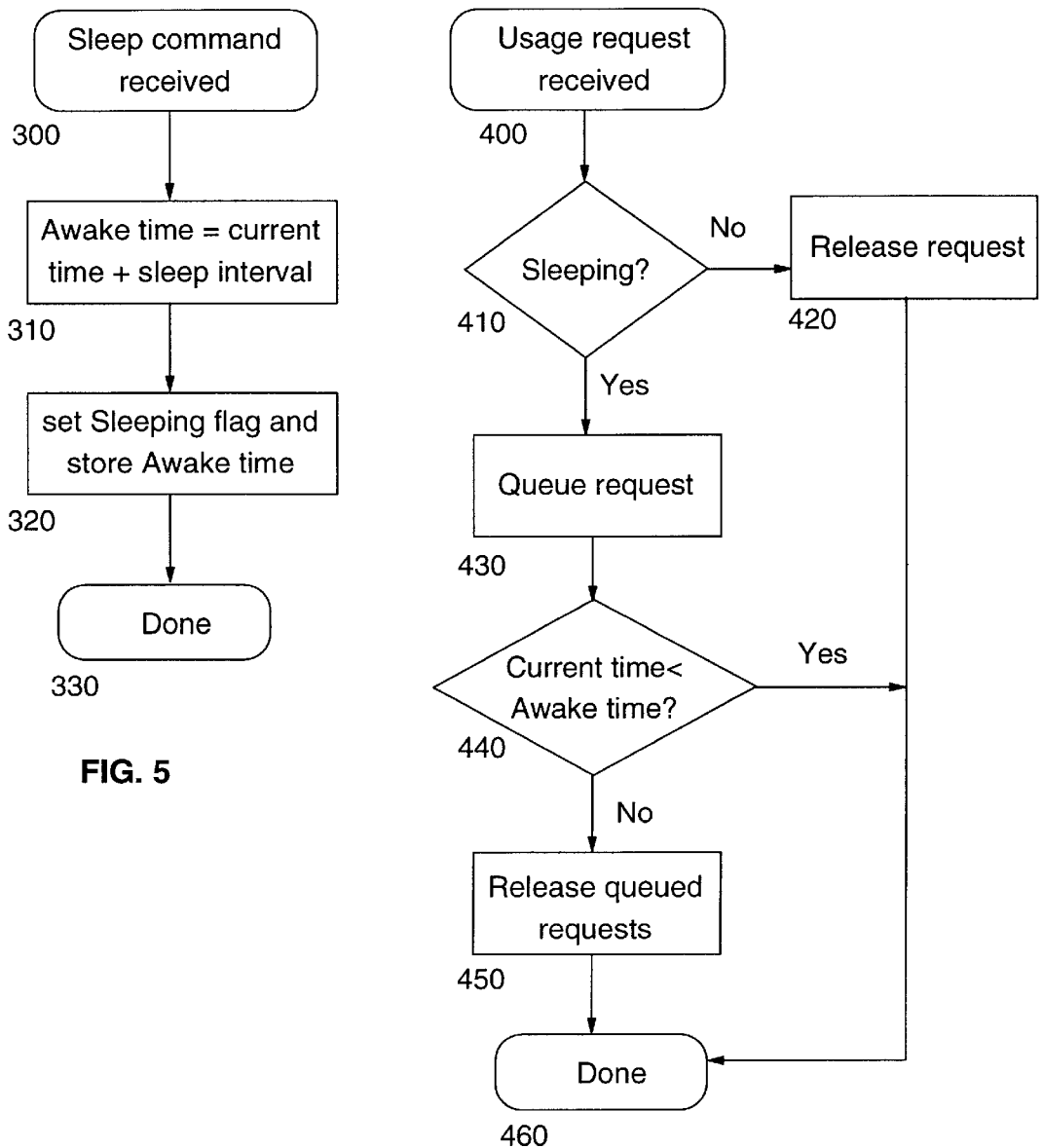
FIG. 5 illustrates the logic a general purpose device driver may use when receiving a request from a scheduler to stop accepting requests.
FIG. 6 illustrates the logic a general purpose device driver may use when receiving requests for the resource it controls.

The general-purpose device drivers for the devices to be reserved in the manner of the present invention must be modified to support the signals and logic described herein. FIG. 5 shows the logic to be performed by the general purpose driver upon receiving a signal from the scheduler-requesting it to stop accepting requests for the disk drive. The sleep interval given on the signal is added to the current time to determine the time at which the device will "wake up" 310. This time is stored, along with a flag indicating that the device is sleeping 320. Any requests that were in progress at the time the signal is received are allowed to complete undisturbed, as the latency time used by the real-time scheduler to compute the look ahead interval will represent the time required to allow the currently executing request to complete.

Then, when the general purpose driver receives a usage request for the disk drive, it performs the logic of FIG. 6. First, the Sleeping flag is checked 410. If the driver is not sleeping, the request is allowed normally 420. If it is, then the request is placed at the end of a queue 430 of usage requests received during the current sleep interval. (This is done before checking to see if the sleep interval has elapsed to ensure that previously queued requests are released before this one, if the sleep interval has indeed elapsed). Then the current time is checked against the Awake time 440 to determine if the sleep interval has elapsed. If it has, then all queued requests are released 450, in first-in-first-out order.

This logic could also be implemented in other ways within the teachings of the present invention, for example instead of commanding the general purpose device driver to sleep for a specified interval, the scheduler could command it to sleep indefinitely and then send it another signal releasing the sleep state after the reserved usage has been completed by the real-time tasks.

When the real-time thread that has reserved use of the disk drive begins to run, the disk drive's command interface will have become idle since its driver had stopped accepting commands. Thus, when the real-time thread executes the reserved operation the disk drive can begin its operation immediately and the real-time thread is blocked only for the length of time of the disk drive's operation.

What is claimed is:

1. A method for sharing resources within a data processing system by ensuring that non-preemptable internally-triggered system resources are available to a real-time program when needed, wherein said data processing system includes: at least a processor; at least one non-preemptable internally-triggered system resource, wherein each of said resources is controlled by at least one associated device driver and has a known maximum operation time, at least one general purpose program which operates on a non-real-time basis; at least one real-time program which operates on a real-time basis and has control of said processor for a selected real-time portion of a cycle of operation; and at least one scheduler which manages control of resources between said real-time and general purpose programs, said method comprising the steps of:

determining a selected one of said at least one real-time programs, wherein said selected real-time program will have control of said processor at a next of said real-time portions of a cycle of operation;

determining a set of one or more of said non-preemptable internally-triggered system resources, said set comprising those resources which said selected real-time program anticipates using;

determining a lookahead interval for each resource in said set; and signaling said associated device driver for each resource in said set, said signal directing said device driver to stop accepting requests from said general purpose programs while said general purpose programs continue to execute, wherein said signaling is performed at a point in time before said next real-time portion of a cycle begins, said point in time being equal to said lookahead interval for said resource.

2. The method as claimed in claim 1, wherein said lookahead interval is greater than or equal to said known maximum operation time for said resource.

3. A computer program product for sharing resources within a data processing system by ensuring that non-preemptable internally-triggered system resources are available to a real-time program when needed, wherein said data processing system includes; at least a processor; at least one non-preemptable internally-triggered system resource, wherein each of said resources is controlled by at least one associated device driver and has a known maximum operation time; at least one general purpose program which operates on a non-real-time basis; at least one real-time program which operates on a real-time basis and has control of said processor for a selected real-time portion of a cycle of operation; and at least one scheduler which manages control of resources between said real-time and general purpose programs, said computer program product comprising:

a computer-readable storage medium having computer-readable code means embodied in said medium, said computer-readable code means comprising:

computer readable program code means for determining a selected one of said at least one real-time programs, wherein said selected real-time program will have control of said processor at a next of said real-time portions of a cycle of operation;

computer readable program code means for determining a set of one or more of said non-preemptable internally-triggered system resources, said set comprising those resources which said selected real-time program anticipates using;

computer readable program code means for determining a lookahead interval for each resource in said set; and computer readable program code means for signaling said associated device driver for each resource in said set, said signal directing said device driver to stop accepting requests from said general purpose programs while said general purpose programs continue to execute, wherein said signaling is performed at a point in time before said next real-time portion of a cycle begins, said point in time being equal to said lookahead interval for said resource.

4. The computer program product as claimed in claim 3, wherein said lookahead interval is greater than or equal to said known maximum operation time for said resource.

5. A system for sharing resources within a data processing system by ensuring that non-preemptable internally-triggered system resources are available to a real-time program when needed, wherein said data processing system includes; at least a processor; at least one non-preemptable internally-triggered system resource, wherein each of said resources is controlled by at least one associated device driver and has a known maximum operation time; at least one general purpose program which operates on a non-real-time basis; at least one real-time program which operates on a real-time basis and has control of said processor for a selected real-time portion of a cycle of operation; and at least one scheduler which manages control of resources between said real-time and general purpose programs, said system comprising:

means for determining a selected one of said at least one real-time programs, wherein said selected real-time program will have control of said processor at a next of said real-time portions of a cycle of operation;

means for determining a set of one or more of said non-preemptable internally-triggered system resources, said set comprising those resources which said selected real-time program anticipates using;

means for determining a lookahead interval for each resource in said set; and means for signaling said associated device driver for each resource in said set, said signal directing said device driver to stop accepting requests from said general purpose programs while said general purpose programs continue to execute, wherein said signaling is performed at a point in time before said next real-time portion of a cycle begins, said point in time being equal to said lookahead interval for said resource.

6. The system as claimed in claim 5, wherein said lookahead interval is greater than or equal to said known maximum operation time for said resource.

* * * * *